(12) United States Patent
Boston et al.

(10) Patent No.: US 9,200,638 B2
(45) Date of Patent: Dec. 1, 2015

(54) ROTOR OF A TURBOMACHINE COMPRESSOR, WITH AN OPTIMISED INNER END WALL

(75) Inventors: Eric Jacques Boston, Cesson (FR); Alexandre Franck Arnaud Chartoire, Paris (FR); Vasiliki Iliopoulou, Ixelles (BE); Ingrid Lepot, Fraiture-en-Condroz (BE); Thierry Jean-Jacques Obrecht, Melun (BE)

(73) Assignees: SNECMA, Paris (FR); CENAERO, Gosselies (BE)

( * ) Notice: Subject to any disclaimer, the term of this patent is extended or adjusted under 35 U.S.C. 154(b) by 651 days.

(21) Appl. No.: 13/498,696

(22) PCT Filed: Oct. 1, 2010

(86) PCT No.: PCT/EP2010/064652
§ 371 (c)(1),
(2), (4) Date: Mar. 28, 2012

(87) PCT Pub. No.: WO2011/039352
PCT Pub. Date: Apr. 7, 2011

(65) Prior Publication Data
US 2012/0201692 A1 Aug. 9, 2012

(30) Foreign Application Priority Data

Oct. 2, 2009 (FR) ...................................... 09 56891

(51) Int. Cl.
*F04D 29/32* (2006.01)
*F01D 5/14* (2006.01)
(52) U.S. Cl.
CPC .............. *F04D 29/321* (2013.01); *F01D 5/143* (2013.01); *F04D 29/329* (2013.01); *F05D 2240/80* (2013.01); *F05D 2250/711* (2013.01); *F05D 2250/712* (2013.01); *Y02T 50/673* (2013.01)

(58) Field of Classification Search
CPC ......... F01D 5/141; F01D 5/143; F01D 5/146; F05D 2240/302; F05D 2240/80; F05D 2250/711; F05D 2250/712; F04D 29/321; F04D 29/329; Y02T 50/673
USPC .............. 416/191, 193 R, 193 A, 235, 236 R, 416/244 A; 415/914
See application file for complete search history.

(56) References Cited

U.S. PATENT DOCUMENTS

| | | | |
|---|---|---|---|
| 2006/0140768 A1 | 6/2006 | Tam et al. | |
| 2007/0059177 A1* | 3/2007 | Harvey | ......................... 416/179 |
| 2007/0258810 A1* | 11/2007 | Aotsuka et al. | ............... 415/206 |
| 2007/0258818 A1* | 11/2007 | Allen-Bradley et al. | . 416/193 A |
| 2010/0172749 A1 | 7/2010 | Mitsuhashi et al. | |
| 2010/0284818 A1* | 11/2010 | Sakamoto et al. | ........ 416/241 R |

FOREIGN PATENT DOCUMENTS

| | | |
|---|---|---|
| EP | 1 681 438 A2 | 7/2006 |
| EP | 1 760 257 A1 | 3/2007 |

(Continued)

OTHER PUBLICATIONS

Preliminary Search Report issued May 11, 2010 in French Patent Application No. 0956891 with English translation of categories of cited documents.

(Continued)

*Primary Examiner* — Dwayne J White
*Assistant Examiner* — Brian P Wolcott
(74) *Attorney, Agent, or Firm* — Oblon, McClelland, Maier & Neustadt, L.L.P.

(57) ABSTRACT

A rotor of a turbomachine compressor, including a bladed rotor disk fitted at its radially external end with a wall forming the inner end of an annual flow channel of a primary gas flow, and formed from multiple angular sectors, each of which is delimited between two blades of the disk which are consecutive in a circumferential direction and includes a bulging portion which is convex in the axial direction and in the circumferential direction, together with, upstream from the bulging portion, a troughed portion which is concave in the axial direction and in the circumferential direction and which has a base which is roughly punctiform.

8 Claims, 2 Drawing Sheets

(56) References Cited

FOREIGN PATENT DOCUMENTS

| EP | 1 762 700 A2 | 3/2007 |
| WO | WO 2008/120748 A1 | 10/2008 |

OTHER PUBLICATIONS

International Search Report issued Jul. 8, 2011 in Application No. PCT/EP2010/064652.

* cited by examiner

ROTOR OF A TURBOMACHINE COMPRESSOR, WITH AN OPTIMISED INNER END WALL

TECHNICAL FIELD

The present invention relates to turbomachine compressors, in particular for aircraft, and it concerns more specifically an inner end wall of an airstream of a primary gas flow in a rotor of such a compressor.

STATE OF THE PRIOR ART

A turbomachine compressor generally includes several successive compression stages, each of which is formed of a rotor comprising a bladed rotating disk, and a stator including an annular row of static blades intended to straighten and guide the gas flow flowing in the compressor.

A problem is posed in the case of compressors in which the gas flow is supersonic relative to a radially external portion of certain blades, notably those of the rotor of the first stage of the compressor, i.e. of its most upstream compression stage, the radial extent of the portion of the blades operating at supersonic speed depending on the speed of displacement of these blades.

The resulting supersonic shocks have an adverse effect on the energy efficiency of the compressors, and therefore that of the turbomachines fitted with these compressors.

DESCRIPTION OF THE INVENTION

One aim of the invention is notably to provide a simple, economic and efficient solution to this problem.

To this end it provides a rotor of a turbomachine compressor, including a rotor disk which holds blades each of which has an extrados surface and an intrados surface, where the disk is fitted, at its radially outer end, with a wall forming the inner end of an annular flow channel of a primary gas flow in the turbomachine, where this wall is formed from multiple angular sectors, each of which is delimited between the extrados surface of a first blade and the intrados surface of a second blade which follows the said first blade directly in a circumferential direction, where each of the said sectors includes a bulging portion which is convex in the axial direction and in the circumferential direction and has an apex located radially outside relative to an imaginary surface of revolution around the axis of the said rotor disk and passing through four points defined by the intersection of the said wall with, respectively, the leading edge of each of the said first and second blades, and the trailing edge of each of the said blades, where the said apex is separated circumferentially from the extrados surface of the said first blade by a distance of between 30% and 70% of the circumferential distance between the said extrados and intrados surfaces of the said blades measured at the said apex, where the said wall also includes, upstream from the said bulging portion, a troughed portion concave in the axial direction.

According to the invention, the said troughed portion is also concave in the circumferential direction, and its base is roughly punctiform.

The abovementioned imaginary surface forms a reference surface relative to which the bulging portion of the inner end wall can be defined.

The conformation of each sector of the inner end wall enables the intensity of the supersonic shock due to the gas flow along the blades held by the rotor disk to be reduced, globally along the full radial extent of a radially outer portion of these blades where such a shock occurs.

The convexity of the bulging portion of each sector of the said wall, both in the axial direction and in the circumferential direction, notably enables the risks of separation of the gas flow along the surfaces of the blades delimiting the said sector, which by their nature reduce rotor efficiency, to be limited. Indeed, the bulging portion causes, downstream from its apex, a deceleration of the gas flow flowing between the abovementioned two blades. The convexity of the bulging portion enables this deceleration to be located away from the surfaces of the blades, and therefore enables the harmful consequences of such a deceleration to be limited, or prevented, when it affects the gas flow along these surfaces.

The troughed portion of each sector of the said wall enables the radial extent of the annular channel upstream from the bulging portion to be increased, and the gradient formed upstream from the apex of this bulging portion on the inner end wall to be accentuated, which helps reduce the intensity of the supersonic shock, notably by permitting a reduction of the maximum Mach number along the extrados surface delimiting the said sector of the inner end wall, and this applies along the entire radial extent of the abovementioned extrados surface.

The invention thus generally enables the global energy efficiency of a turbomachine compressor rotor to be improved.

The concavity of the said troughed portion of each sector of the inner end wall in the circumferential direction enables the undesirable increase of the speed of the gas admitted by the rotor stage, due to the increase of the radial extent of the annular channel caused by the troughed portion, to be reduced substantially.

To this end, the base of the troughed portion of each sector of the inner end wall is preferably separated circumferentially from the extrados surface of the said first blade by a distance of between 30% and 70% of the circumferential distance between the said extrados and intrados surfaces of the abovementioned blades, measured at the said base.

In addition, the base of the troughed portion of each sector of the inner end wall is preferably located radially inside relative to the abovementioned imaginary surface.

The inner end wall is advantageously shaped such that for each of the said sectors of this wall the bulging portion and the troughed portion of the said sector have in common at least one junction point located on the abovementioned imaginary surface.

This characteristic enables the presence of substantial bulges between the base of the troughed portion and the apex of the bulging portion of each sector of the inner end wall to be ruled out. Indeed, it is preferable that each sector of this wall has a gradual and continuous gradient between the base of its troughed portion and the apex of its bulging portion, in order to prevent any discontinuity of the airstream of the primary flow.

In the preferred embodiment of the invention the apex of the bulging portion of each sector of the inner end wall is axially separated from the downstream edge of the said wall by a distance of between 20% and 40% of the axial distance between the upstream edge and the downstream edge of this wall.

In comparable fashion, the base of the troughed portion of each sector of the inner end wall is advantageously axially separated from the upstream edge of the said wall by a distance of between 20% and 40% of the axial distance between the upstream edge and the downstream edge of this wall.

These preferential characteristics enable the deformations of the inner end wall in proximity to the upstream and downstream edges of this inner end wall, due to the presence of the bulging portion and the troughed portion, to be limited, so as to limit optimally the disturbance of the gas flow in the vicinity of these upstream and downstream edges, which reduce rotor performance.

In addition, the apex of the bulging portion and the base of the troughed portion of each sector of the inner end wall are preferably separated radially from the abovementioned imaginary surface by a distance of between 1% and 5% of the radial extent of the blades supported by the disk.

This characteristic enables rotor performance to be optimised as far as possible.

The invention also concerns a turbomachine compressor, including a rotor of the type described above, and also a turbomachine fitted with such a compressor.

In the case of a compressor including several compression stages, it is particularly advantageous for the rotor of the first of these stages, when counting them from upstream, to be of the type described above, since it is generally in this upstream stage that the supersonic shocks have the greatest adverse effects on the compressor's performance.

BRIEF DESCRIPTION OF THE ILLUSTRATIONS

The invention will be better understood, and other details, advantages and characteristics of it will appear, on reading the following description given as a non-restrictive example, and with reference to the appended illustrations, in which.

DETAILED DESCRIPTION OF A PREFERRED EMBODIMENT

Figure 1:
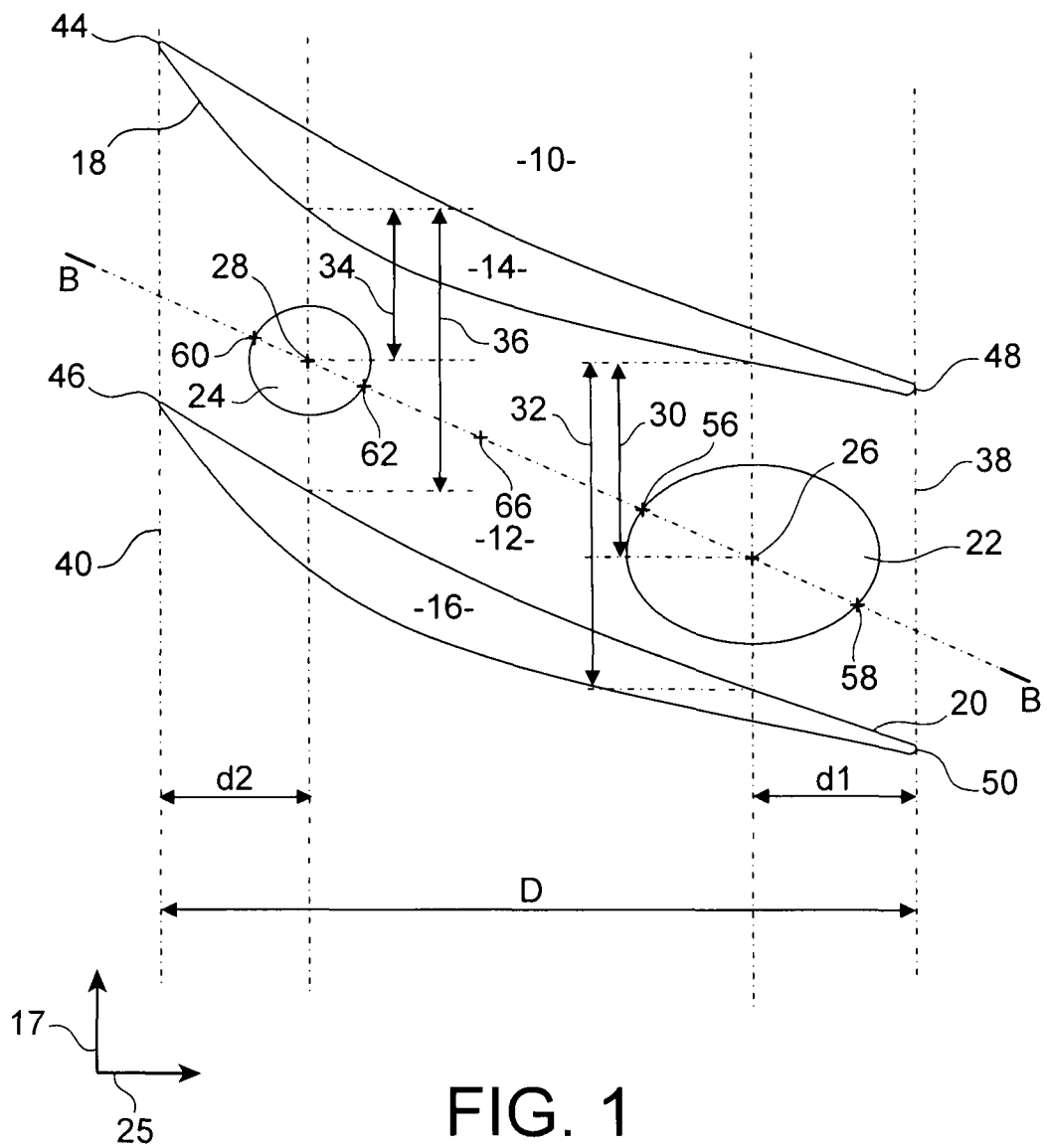
FIG. 1 is a partial schematic view of an angular sector of an inner end wall of a rotor stage according to the invention, in an orthogonal projection on a plane A-A (FIG. 2) passing through the axis of the rotor and parallel to a straight line connecting two points defined by the intersection of the said wall with, respectively, the leading edges of both blades delimiting the said angular sector.

FIG. 1 illustrates an inner end wall 10 of a compressor rotor according to the invention, for example in an aircraft turbojet, seen as an orthogonal projection in plane A-A.

This inner end wall 10 is formed on the radially external periphery of a rotating bladed disk of this rotor, and delimits internally an annular flow channel of a gas flow in this rotor disk, this channel being commonly called the primary airstream.

Inner end wall 10 can be formed by platforms fitted to the blades supported by the abovementioned disk, and which are installed end-to-end circumferentially, or this wall may be manufactured as one piece with the disk if this bladed disk is of the monobloc type, in a well-known manner.

Inner end wall 10 has a globally tapering shape, the section of which increases in size from upstream to downstream.

The blades supported by the disk delimit in inner end wall 10 multiple angular sectors, such as sector 12 which can be seen in FIG. 1, which is limited by two blades 14 and 16 of the abovementioned disk, which are consecutive in the circumferential direction symbolised by arrow 17 in FIG. 1. More accurately, sector 12 is delimited by extrados surface 18 of blade 14 and by intrados surface 20 of blade 16.

In FIG. 1, inner end wall 10 is represented in an orthogonal projection in a plane passing through the axis of the rotor and parallel to the straight line connecting firstly the intersection of wall 10 with the upstream edge, or leading edge, of blade 14 and, secondly, the intersection of wall 10 with the upstream edge, or leading edge, of blade 16.

According to the invention, each sector 12 of inner end wall 10 includes a bulging portion 22, and a troughed portion 24 formed upstream from bulging portion 22, where both this bulging portion 22 and this troughed portion 24 are arbitrarily symbolised in FIG. 1 by two ellipses, the definition of which will become clearer in what follows.

Bulging portion 22 is convex in the axial direction, symbolised by arrow 25, and in the circumferential direction 17, such that it has an apex 26 which is roughly punctiform.

In comparable fashion, troughed portion 24 is concave in the axial direction and in the circumferential direction, such that it has a base 28 which is roughly punctiform.

Apex 26 of bulging portion 22 is circumferentially separated from extrados surface 18 of blade 14 by a distance of between 30% and 70% of the circumferential distance between this extrados surface and intrados surface 20 of blade 16, measured axially level with apex 26. The circumferential separation between apex 26 and extrados surface 18 is symbolised by arrow 30 in FIG. 1 as a projection in plane A-A, whilst the circumferential distance between extrados surface 18 and intrados surface 20 at apex 26 is symbolised by arrow 32 in this FIG. 1. It will, however, be noted that the circumferential distances are angular distances which differ from the distances observable as projections in plane A-A.

In comparable fashion, base 28 of troughed portion 24 is circumferentially separated from extrados surface 18 of blade 14 by a distance of between 30% and 70% of the circumferential distance between this extrados surface 18 and intrados surface 20 of blade 16, measured axially level with base 28. The circumferential separation between base 28 and extrados surface 18 is symbolised by arrow 34 in FIG. 1, whilst the circumferential distance between extrados surface 18 and intrados surface 20 at base 28 is symbolised by arrow 36 in this FIG. 1.

This enables the influence of bulging portion 22 and troughed portion 24 on the airflow along surfaces 18 and 20 of blades 14 and 16, in proximity to inner end wall 10, to be limited.

Apex 26 of bulging portion 22 is axially separated from downstream edge 38 of inner end wall 10 by a distance d1 of between 20% and 40% of axial distance D between upstream edge 40 and downstream edge 38 of this wall 10.

In comparable fashion, base 28 of troughed portion 24 is axially separated from upstream edge 40 of inner end wall 10 by a distance d2 of between 20% and 40% of the axial distance between upstream edge 40 and downstream edge 38 of wall 10.

In this fashion, upstream edge 40 and downstream edge 38 of inner end wall 10 are roughly circular in shape, which improves rotor performance.

Figure 2:
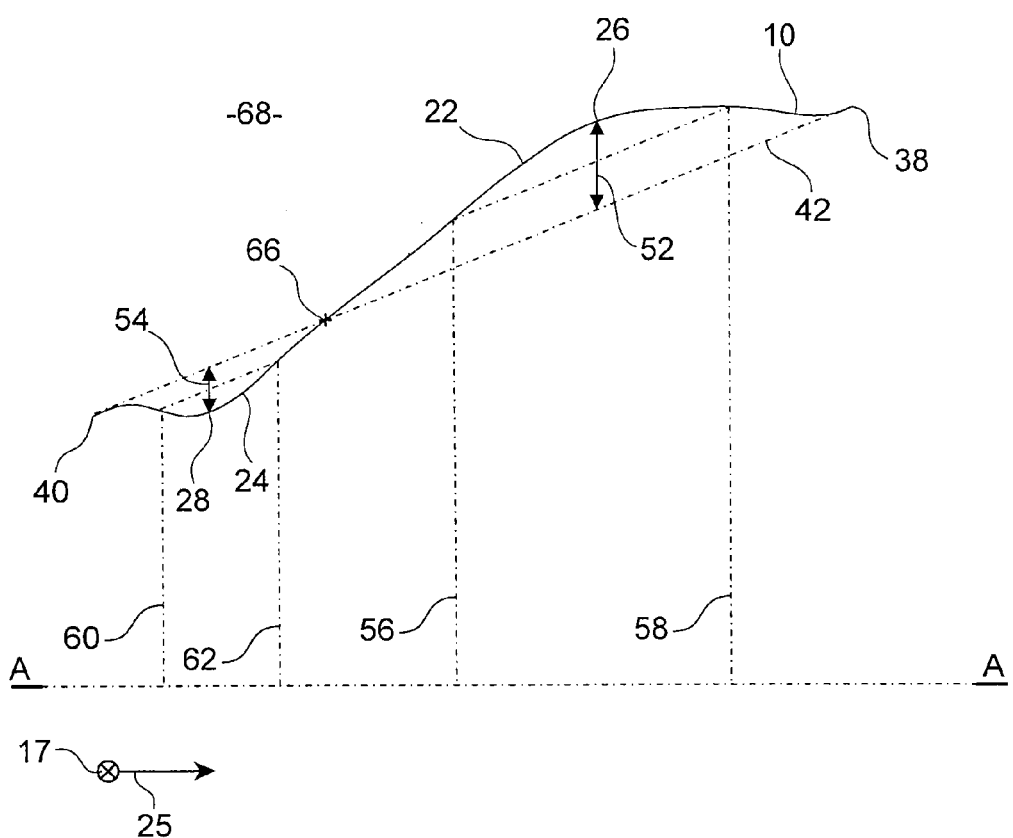
FIG. 2 is a partial schematic internal view of the angular sector of the inner end wall of FIG. 1, as a section in a plane B-B which passes through the base of a troughed portion of the said sector and through the apex of a bulging portion of this sector, and which is perpendicular to the abovementioned plane A-A.

Bulging portion 22 and troughed portion 24 can be more precisely defined relative to an imaginary surface 42 of revolution around the axis of the disk of the rotor, and more specifically of tapered shape in the embodiment represented in FIGS. 1 and 2. This imaginary surface 42 can be defined by four points corresponding to the intersection of wall 10 with, respectively, firstly respective upstream edges, or leading edges, 44 and 46 of the two consecutive blades 14 and 16 delimiting sector 12 of inner end wall 10 and, secondly, downstream edges, or trailing edges, 48 and 50 of these blades.

Imaginary surface 42 is illustrated in FIG. 2, which also shows inner end wall 10, in a section in plane B-B which can be seen in FIG. 1.

In FIG. 2, arrow 52 illustrates the radial separation of apex 26 of bulging portion 22 relative to imaginary surface 42. This separation is between 1% and 5% of the radial extent of blades 14 and 16. In comparable fashion, arrow 54 illustrates the radial separation of base 28 of troughed portion 24 relative to imaginary surface 42, a separation which is also between 1% and 5% of the radial extent of the blades. Naturally, radial separations 52 and 54 of apex 26 and base 28 can have different values, as in FIG. 2.

The ellipse symbolising bulging portion 22 in FIG. 1 shows the points of this bulging portion the radial separation of which relative to imaginary surface 42 is equal to half the radial separation 52 of apex 26 of this bulging portion 22 relative to imaginary surface 42. These points are the respective intersections of broken lines 56 and 58 with inner end wall 10 in plane B-B, in FIG. 2.

In comparable fashion, the ellipse symbolising troughed portion 24 in FIG. 1 shows the points of this troughed portion the radial separation of which relative to imaginary surface 42 is equal to half radial separation 54 of base 28 of the troughed portion, and among which are found the points of intersection of wall 10 respectively with broken lines 60 and 62 of FIG. 2.

In the embodiment represented in FIGS. 1 and 2, bulging portion 22 and troughed portion 24 defined relative to imaginary surface 42 have a point of junction 66 in common located on this imaginary surface 42. In this embodiment, point of junction 66 is also located in plane B-B of FIG. 1.

The gradient of sector 12 of inner end wall 10, defined between apex 26 of bulging portion 22 of this sector 12 and base 28 of its troughed portion 24, enable the convergence, from upstream to downstream (arrow 25), of annular gas flow channel 68 to be increased in the disk of the rotor, relative to imaginary surface 42, which is roughly equal to an inner end wall of the prior art. This notably enables the compression rate of this rotor to be improved.

Generally, the configuration of the inner end wall enables the impact of the supersonic shock occurring in a radially external portion of the blades of the disk to be reduced, whilst optimally restricting the increase of the flow rate admitted in this disk. As a rough guide, the global energy efficiency of a compression stage including a rotor associated with a stator may be improved by approximately 0.2% with a rotor according to the invention.

The invention claimed is:

1. A rotor of a turbomachine compressor, comprising:
a rotor disk which holds blades each of which has an extrados surface and an intrados surface,
wherein the disk is fitted, at its radially outer end, with a wall forming an inner end of an annular flow channel of a primary gas flow in the turbomachine,
wherein this wall is formed from multiple angular sectors, each of which is delimited between the extrados surface of a first blade and the intrados surface of a second blade which follows the first blade directly in a circumferential direction,
wherein each of the sectors include a bulging portion which is convex in the axial direction and in the circumferential direction and has an apex located radially outside relative to an imaginary surface of revolution around the axis of the rotor disk and passing through four points defined by the intersection of the wall with, respectively, a leading edge of each of the first and second blades, and a trailing edge of each of the blades,
wherein the apex of the bulging portion is roughly punctiform and is separated circumferentially from the extrados surface of the first blade by a distance of between 30% and 70% of the circumferential distance between the extrados and intrados surfaces of the blades measured at the apex, and
wherein the wall also includes, upstream from the bulging portion, a troughed portion which is concave in the axial direction and concave in the circumferential direction, and has a base which is roughly punctiform and is located upstream from the apex of the bulging portion.

2. A rotor according to claim 1, wherein the base of the troughed portion of each sector of the wall is separated circumferentially from the extrados surface of the first blade by a distance of between 30% and 70% of the circumferential distance between the extrados and intrados surfaces of the blades, measured at the base.

3. A rotor according to claim 1, wherein for each of the sectors of the wall, the base of the troughed portion is located radially inside relative to the imaginary surface.

4. A rotor according to claim 3, wherein the wall is shaped such that for each of the sectors of this wall, the bulging portion and the troughed portion of the sector have in common at least one point of junction located on the imaginary surface.

5. A turbomachine compressor including a rotor according to claim 1.

6. A turbomachine including a compressor according to claim 5.

7. A rotor according to claim 1, wherein the bulging portion and the troughed portion are the only perturbations of each one of the sectors with respect to said imaginary surface of revolution.

8. A rotor according to claim 1, wherein the transversal section of the bulging portion with respect to the axis of the rotor disk is a protrusion with respect to the imaginary surface.

* * * * *